United States Patent [19]

Öhlschläger et al.

[11] 4,276,373
[45] Jun. 30, 1981

[54] PHOTOSENSITIVE PHOTOGRAPHIC MATERIAL CONTAINING A LIGHT-ABSORBING DYE

[75] Inventors: Hans Öhlschläger, Bergisch-Gladbach; Lothar Rosenhahn, Cologne; Wolfgang Sauerteig, Leverkusen, all of Fed. Rep. of Germany

[73] Assignee: AGFA-Gevaert, A.G., Leverkusen, Fed. Rep. of Germany

[21] Appl. No.: 131,808

[22] Filed: Mar. 19, 1980

[30] Foreign Application Priority Data

Mar. 24, 1979 [DE] Fed. Rep. of Germany ....... 2911695

[51] Int. Cl.³ .............................................. G03C 1/84
[52] U.S. Cl. ................................... 430/507; 430/519; 430/562
[58] Field of Search .................. 430/519, 562, 507

[56] References Cited

U.S. PATENT DOCUMENTS

| | | | |
|---|---|---|---|
| 2,503,717 | 4/1950 | Fierke et al. ........................ 430/519 |
| 3,671,257 | 6/1972 | Otto et al. ............................ 430/562 |
| 3,790,379 | 2/1974 | Oishi et al. ........................... 430/562 |
| 4,029,503 | 6/1977 | Fujiwhara et al. .................. 430/562 |

*Primary Examiner*—Jack P. Brammer
*Attorney, Agent, or Firm*—Connolly & Hutz

[57] ABSTRACT

A photosensitive recording material containing at least one silver halide layer and an azo dye is disclosed.

8 Claims, No Drawings

PHOTOSENSITIVE PHOTOGRAPHIC MATERIAL CONTAINING A LIGHT-ABSORBING DYE

This invention relates to a photosensitive photographic recording material comprising at least one silver halide emulsion layer which contains azo dyes. More particularly, the invention relates to a photographic material comprising intermediate layers which contain azo dyes as yellow filter dyes.

It is known that light-absorbing dyes may be incorporated into photographic recording materials. A dye such as this may be used above at least one photosensitive silver halide emulsion layer or between two photosensitive emulsion layers in order to protect the underlying emulsion layer from the effects of light having the wavelength absorbed by the dye. It is also known that dyes may be used as screening dyes in a photosensitive emulsion layer itself or as antihalation dyes in a layer known as an antihalation layer.

Where the spectral composition of the light striking a photosensitive photographic silver halide emulsion layer has to be monitored or controlled, it is possible for this purpose to incorporate in the photosensitive photographic material a coloured layer which is known as a filter layer. Thus, for example, a photographic materials a yellow coloured filter layer is generally arranged between the blue-sensitive yellow layer and the underlying green-sensitive and red-sensitive layers in order to keep the blue light away from the green- and red-sensitive layers.

The dyes used in photographic materials have to satisfy stringent requirements. Not only do they have to show a suitable spectral absorption corresponding to the particular application, but they are also required to be photochemically inert. In particular, the dyes must not have any adverse effects on the quality of the photographic silver halide emulsion. Accordingly, they should not depress sensitivity, for example, or cause fogging. In addition, although, the dyes should be resistant to diffusion in the material, they should be completely and irreversibly decolourised or washed out of the layer during processing of the material so that no undesirable colouration is left behind on the exposed and developed photographic material.

These requirements are not satisfactorily fulfilled by the known dyes. The colloidal silver normally used in yellow filter layers easily leads to fogging in the adjacent emulsion layers. Organic dyes which are made resistant to diffusion through the introduction of long alkyl chains are not decolourised or are only incompletely decolourised in normal photographic processing baths. Where dyes are fixed with a mordant, the mordant effect is generally not sufficient to anchor the dye to the necessary extent in the mordant layer.

German Offenlegungsschrift No. 2,347,590 and the corresponding Patent Specification DL 107,990 describe certain sulphonamide-substituted azo dyes which are said to be particularly suitable for yellow filter layers. However, these dyes are also inadequate in regard to diffusion resistance. In addition, these dyes generally crystallise out easily from gelatin solutions which leads to casting defects during further processing. Reference is made in this connection to Patent Specification DL No. 130,265 in which it is also pointed out that the azo dyes known from DL-PS No. 107,990 show an undesirable tendency to crystallise out and cause unacceptably high residual colouration.

The object of the present invention is, inter alia, to provide photographic materials containing dyes which may be used in antihalation layers or filter layers and, in particular, in yellow filter layers. These dyes are intended to have none of the disadvantages referred to above and to satisfy the requirements of photographic practice in regard to diffusion resistance, their ability to be washed out and their absorption properties.

Accordingly, the invention relates to a photosensitive photographic recording material containing at least one silver halide emulsion layer and an azo dye corresponding to the following formula:

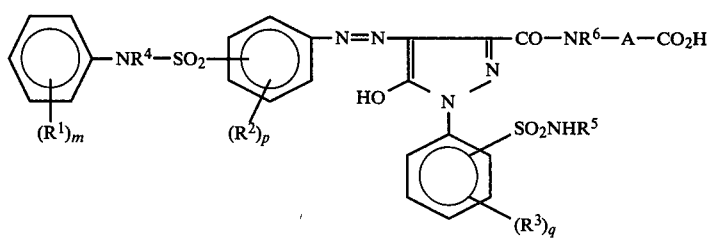

in which:

$R^1$, $R^2$, $R^3$ which may be the same or different represent hydrogen; alkyl which may be substituted preferably containing up to 6 carbon-atoms such as, for example, methyl, ethyl, propyl, butyl or allyl; aryl, which may be substituted, particularly phenyl; alkoxy, particularly methoxy or ethoxy; halogen, particularly fluorine, chlorine or bromine; carbamoyl or sulphamoyl groups which may be substituted; amino groups which may be substituted; a cyano group;

$R^4$, $R^5$, $R^6$ which may be the same or different and represent hydrogen; alkyl which may be substituted, preferably containing from 1 to 4 carbon-atoms, for example methyl; A represents a difunctional hydrocarbon chain, particularly one containing from 1 to 6 carbon-atoms;

m is an integer of from 1 to 5 and p, and q are the same or different and represent an integer of from 1 to 4.

The above-mentioned substituents may in turn be substituted by the usual photographic substituents.

In preferred compounds corresponding to formula (I), the substituents $R^4$, $R^5$ and $R^6$ represent hydrogen.

Particularly preferred compounds of formula (I) correspond to the following formula:

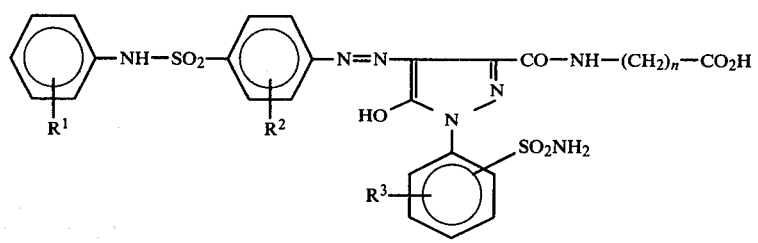
in which
R¹, R² and R³ are as defined above and n is an integer, particularly an integer of from 1 to 6. In particularly preferred compounds of formula (II), n, is an integer of from 1 to 5 and R³ is hydrogen. Particularly suitable compounds are listed in Table I below:

TABLE I-continued
Dye No.
(7) 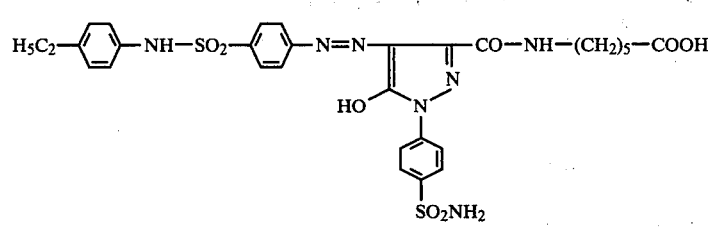
(8) 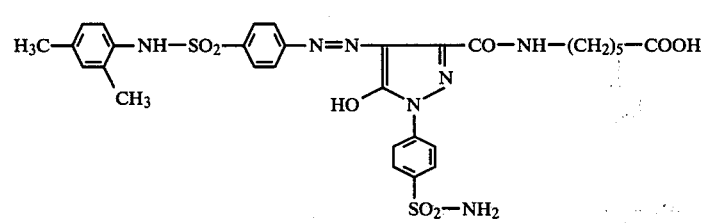
(9) 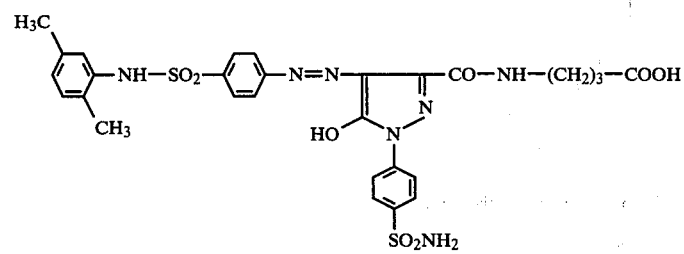
(10) 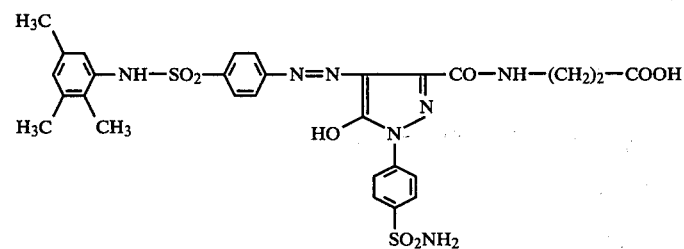
(11) 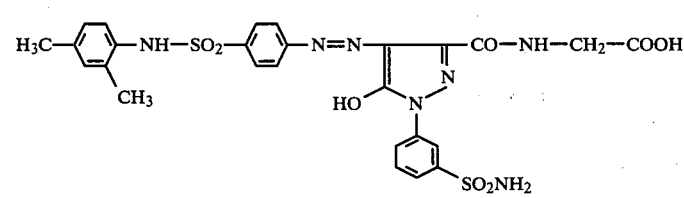
(12) 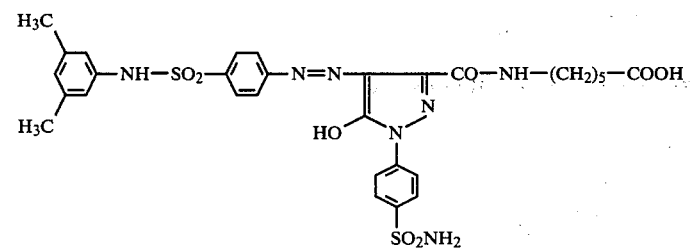
(13) 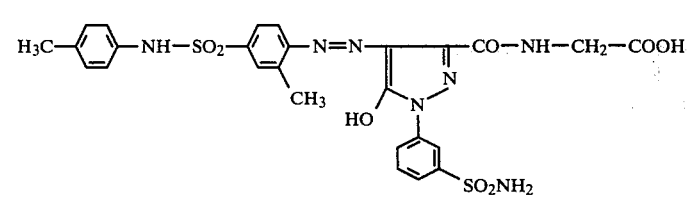

TABLE I-continued
Dye No.
(14) 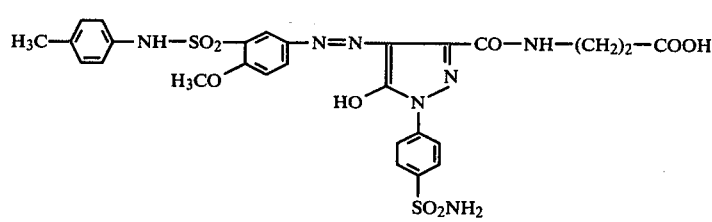
(15) 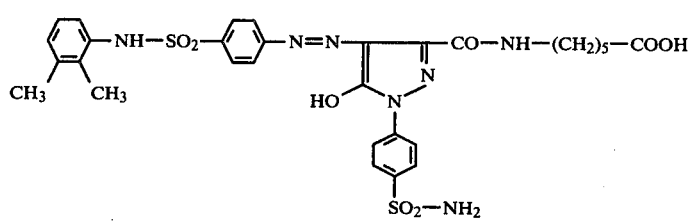
(16) 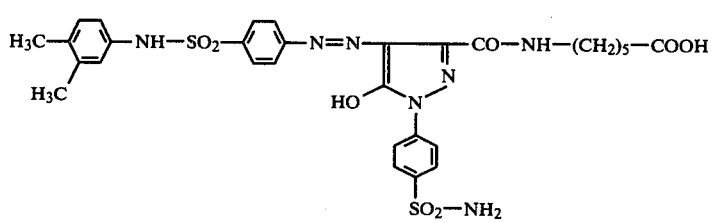
(17) 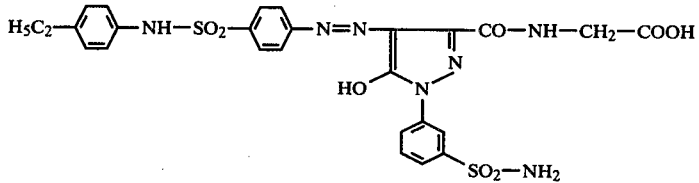
(18) 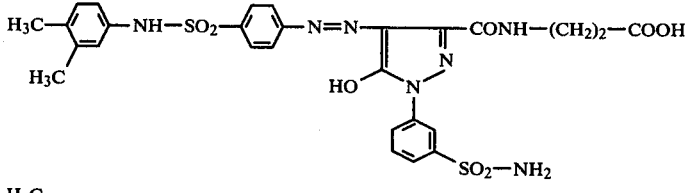
(19) 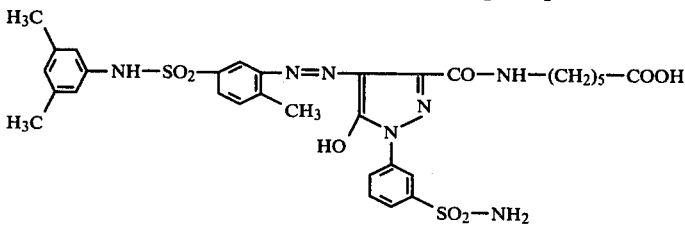
(20) 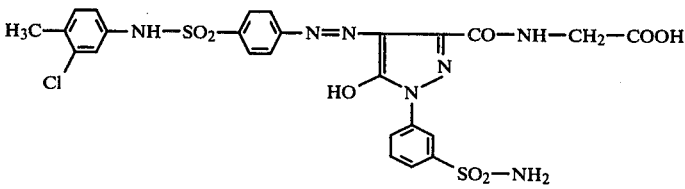
(21) 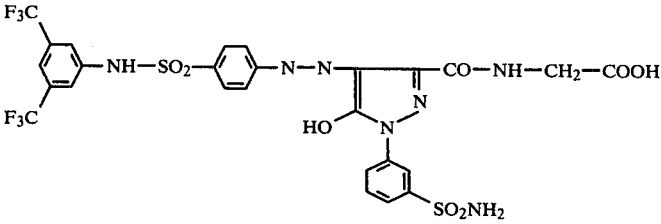

TABLE I-continued

Dye No.

(22)

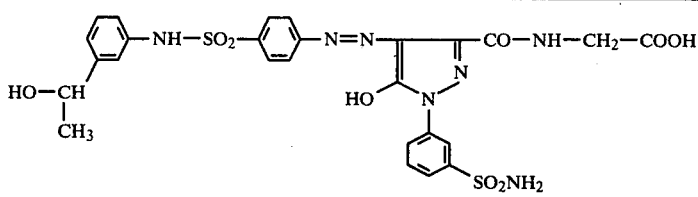

The compounds which may be used in accordance with the invention may readily be produced by diazotizing the corresponding amines and coupling them with a pyrazolone to form azo dyes. Further reaction with aminocarboxylic acid esters gives amides which may readily be hydrolysed to form the dyes (I) useable in accordance with the invention.

The production of dye No. 3 is described in detail in the following, the process used being applicable to all of the dyes.

DYE NO. 3

(a) 65.5 g (0.25 mole) of 4-aminobenzene sulphonic acid -p-toluidide are dissolved in 500 ml of acetone, followed by the addition of concentrated hydrochloric acid. 17.3 g (0.25 mole) of sodium nitrite dissolved in 75 ml of water are then slowly added dropwise with stirring. The diazonium salt solution is stirred for 1 hour at 0° to 2° C. and then added dropwise at 8° to 10° C. to a solution of 77.7 g (0.25 mole) of 1-(3-sulphonamido-phenyl)-pyrazolone-3-carboxylic acid ethyl ester in 250 ml of pyridine. The mixture is then stirred for 1 hour at 8° to 10° C. and then for 3 hours at room temperature, the dye precipitating. The dye is filtered off under suction, washed with water and methanol and dried in vacuo at 80° C. Yield 133.7 g, M.p. 198°-200° C.

(b) 58.4 g (0.1 mole) of the dye produced in accordance with (a) and 28.0 g (0.2 mole) of aminoacetic acid ethyl ester hydrochloride are heated with stirring to 80° C. in 125 ml of pyridine. At this temperature, 42 ml (0.3 mole) of triethyl amine are added dropwise over a period of 30 minutes. The mixture is then heated for 1 hour to 80° C., cooled and the dye precipitated with dilute hydrochloric acid, filtered off under suction and washed with water and methanol. For hydrolysis, the dye is dissolved without further purification in 10% sodium hydroxide solution, stirred for 30 minutes at room temperature and then precipitated with dilute hydrochloric acid. The dye is filtered off under suction and washed twice with water, after which it is dried in vacuo at 80° C. Yield 51.4 g, M.p. 185° C. (decomposition).

In a preferred embodiment of the invention, the dyes of the formula (I) are used in a filter layer, preferably in a yellow filter layer which is preferably arranged between the blue-sensitive layer and the underlaying green-sensitive and red-sensitive layers of a photographic material.

The dyes of formula (I) may be incorporated into the layers of a photographic material in the usual way by dissolving in water in the presence of a base, adding the resulting solution to a gelatin solution and correcting the pH-value with an acid.

They surprisingly show outstanding resistance to diffusion and may be rapidly and completely removed from the photographic material on treatment with alkaline solutions of the type normally used in photographic processing. This is all the more surprising insofar as a prejudice against this is apparent from DL-PS No. 130,265.

The present invention is suitable for photographic materials containing any silver halide emulsions. The silver halide in these emulsions may be formed by silver bromide, silver chloride or mixtures thereof, which may have a small content of silver iodide of up to 10 mole percent.

The photographic materials may be developed with standard colour developer substances, for example, N,N-dimethyl-p-phenylene diamine; 4-amino-3-methyl-N-ethyl-N-methoxyethyl-aniline, 2-amino-5-diethylaminotoluene, N-butyl-N-ω-sulphobutyl-p-phenylene diamine, 2-amino-5-(N-ethyl-N-$\beta$-methane-sulphonamido-ethylamino)-toluene, N-ethyl-N-$\beta$-hydroxyethyl-p-phenylene diamine, N,N-bis-($\beta$-hydroxyethyl)-p-phenylene diamine, 2-amino-5-(N-ethyl-N-$\beta$-hydroxyethylamino)-toluene. Other suitable colour developers are described for example in J. Amer. Chem. Soc. 73, 3100 (1951).

The photographic material may contain the usual colour couplers which may be incorporated in the silver halide layers themselves. For examples of suitable colour couplers, see W. Pelz's Article entitled "Farbkuppler (Colour Couplers)" in "Mitteilungen aus den Forschungslaboratorien der Agfa, Leverkusen/Munchen", Vol. III (1961) and K. Venkataraman in "The Chemistry of Synthetic Dyes", Vol. 4, 341 to 387, Academic Press, 1971.

Other non-diffusing colour couplers which may be used are 2-equivalent couplers, for example the known DIR-couplers. The non-diffusing colour couplers and dye-producing coupounds may be added to the photosensitive silver halide emulsions or other casting solutions by standard known methods.

Where the non-diffusing colour couplers and dye-producing compounds are water-insoluble or alkali-insoluble compounds, they may be emulsified in known manner. So-called coupler solvents or oil formers may additionally be used for incorporating hydrophobic compounds such as these by emulsification. Reference is made for example to U.S. Pat. Nos. 2,322,027; 2,533,514; 3,689,271; 3,764,336 and 3,765,897.

Gelatin is preferably used as binder for the photographic layers. However, it may be completely or partly replaced by other natural or synthetic binders.

The emulsions may also be chemically sensitised, for example by the addition of suphur-containing compounds during chemical ripening, for example allyl isothiocyanate, allyl thiourea and sodium thiosulphate. Other suitable chemical sensitizers are reducing agents, for example the tin compounds described in Belgian Pat. Nos. 493,464 or 568,687, and polyamides such as diethylene triamine or aminomethyl sulphinic acid derivatives, for example according to Belgian Pat. No. 547,323. Suitable chemical sensitisers are also noble metals and noble metal compounds, such as gold, platinum, palladium, iridium, ruthenium or rhodium. It is also possible to sensitise the emulsions with polyalkylene oxide derivatives, for example with polyethylene oxide having a molecular weight of from 1000 to 20,000. also with condensation products of alkylene oxides and alcohols, aliphatic carboxylic acids, aliphatic diamines and amides.

The emulsions may also be optically sensitised, for example with the usual polymethine dyes, such as neutrocyanines, basic or acid carbocyanines, rhodacyanines, hemicyanines, styryl dyes, oxonols and the like. Sensitisers such as these are described in F. M. Hamer's book entitled "The Cyanine Dyes and Related Compounds" (1964).

The emulsions may contain the usual stabilisers such as, for example, homopolar or salt-like compounds of mercury with aromatic or heterocyclic rings, such as mercaptotriazoles, simple mercury salts, sulphoniummercury double salts and other mercury compounds. Other suitable stabilisers are azaindenes, preferably tetra- or penta-azaindenes, particularly those substituted by hydroxyl or amino groups. Compounds such as these are described for example in the article by Birr in Z. Wiss. Phot. 47 (1952), 2 to 58. Other suitable stabilisers are, inter alia, heterocyclic mercapto compounds, for example phenyl mercaptotetrazole, quaternary benzthiazole derivatives and benzotriazole.

The layers of the photographic material may be hardened in the usual way, for example with formaldehyde or halogen-substituted aldehydes containing a carboxyl group, such as mucobromic acid, diketones, methane sulphonic acid esters and dialdehydes. In addition, the photographic layers may be hardened with hardeners of the epoxide heterocyclic ethylene imine or acryloyl type. It is also possible to harden the layers by the process according to German Offenlegungsschrift No. 2,218,009 in order to obtain colour photographic materials which are suitable for processing at high temperatures. The photographic layers or the colour photographic multilayer materials may also be hardened with hardeners of the diazine, triazine or 1,2-dihydroquinoline series. Examples of hardeners such as these are diazine derivatives containing alkyl- or arylsulphonylgroups, derivatives of hydrogenated diazines or triazines such as, for example, 1,3,5-hexahydrotriazine; fluorine-substituted diazine derivatives such as, for example, fluoropyrimidine; esters of 2-substituted 1,2-dihydroquinoline or 1,2-dihydro-iso-quinoline-N-carboxylic acids. Other suitable hardeners are vinyl sulphonic acid hardeners, carbodiimide or carbamoyl hardeners of the type described for example in German Offenlegungsschrifts No. 2,263,602; 2,225,230; and 1,808,685; French Pat. No. 1,491,807; German Pat. No. 872,153 and East German Pat. No. 7218. Other suitable hardeners are described for example in British Pat. No. 1,268,550.

EXAMPLE 1

The following layers are successively applied to a cellulose triacetate support layer provided with an adhesion layer. The corresponding quantities of $AgNO_3$ are indicated for the silver coating.

COMPARISON MATERIAL

1. A red-sensitized silver halide emulsion (96% of silver bromide, 4% of silver iodide) containing a cyan coupler of the following formula

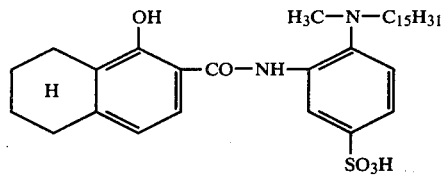

Silver coating: 1.1 g/m$^2$

2. A gelatin intermediate layer containing, per g of casting solution, 3 g of a polymeric white coupler with recurring units of the following formula

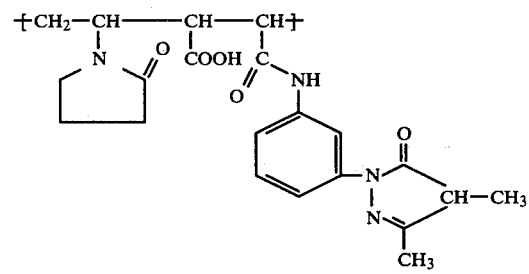

3. A green-sensitised silver halide emulsion (96% of silver bromide, 4% of silver iodide) containing a magenta coupler of the following formula

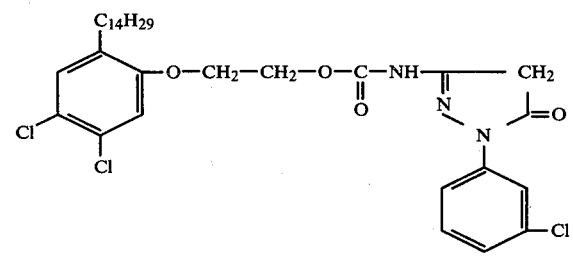

Silver coating: 0.8 g/m$^2$.

4. A standard yellow filter layer of silver sol. The silver sol was obtained in known manner. The colour density of the yellow filter layer, as measured behind a blue filter, amounts to 0.6.

5. An unsensitised silver bromide emulsion having an iodide content of 2% and containing a yellow coupler of the following formula

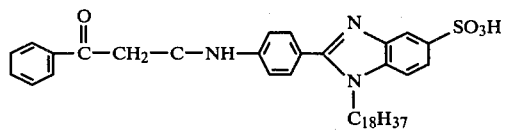

Silver coating: 1.3 g/m$^2$

MATERIAL ACCORDING TO THE INVENTION

A material according to the invention is prepared in the same way except that, instead of the described yellow filter layer, a yellow filter layer having the same colour density is prepared using dye No. 9 according to the invention. To this end, the dye is dissolved in water in the presence of sodium hydroxide, the aqueous solution is adjusted to the required pH-value and suitably applied to the photographic material.

Both materials, namely the comparison material and the material according to the invention, are stored for 2 days at 23° C., exposed imagewise behind a continuous wedge and subjected to the following processing cycle at 20° C.:

Black-and-white development 7 minutes in a developer consisting of

| distilled water | 300 ml |
|---|---|
| sodium metahexaphosphate | 2 g |
| p-methylaminophenol | 2.3 g |
| anhydrous sodium sulphite | 50 g |
| hydroquinone | 6.6 g |
| anhydrous sodium carbonate | 50 g |
| potassium thiocyanate | 3.5 g |
| potassium bromide | 1.8 g |
| potassium iodide | 0.008 g | made up with water to 1000 ml; pH=10

Stop bath 5 minutes in a solution of

| distilled water | 300 ml |
|---|---|
| cryst. sodium acetate | 30 g |
| acetic acid | 5 ml | made up with water to 1000 ml; pH=5
Intermediate rinsing: 10 minutes
Diffuse reverse exposure: 2 minutes
Colour development:
18 minutes in a colour developer consisting of:

| distilled water | 300 ml |
|---|---|
| nitrolotriacetic acid | 2 g |
| N,N-diethyl-p-phenylene diamine | 3.5 g |
| trisodium phosphate | 20 g |
| potassium bromide | 0.7 g |
| hydroxylamine | 0.8 g | made up with water to 1000 ml; pH=11.7.
Intermediate rinsing: 5 minutes
Bleaching:
5 minutes in a bleaching bath consisting of

| potassium ferricyanide | 8 g |
|---|---|
| potassium bromide | 20 g |
| disodium phosphate | 12 g | made up with water to 1000 ml and adjusted with acetic acid to pH 5.2.
Intermediate rinsing: 5 minutes
Fixing:
5 minutes in a fixing bath consisting of

| ammonium thiosulphate | 150 g |
|---|---|
| anhydrous sodium sulphite | 10 g |
| sodium metahexaphosphate | 2 g | made up with water to 1000 ml.; pH=7.
Final rinsing: 5 minutes

The results obtained are shown in Table II.

TABLE II

| | Sensitivity | | | Maximal density | | |
|---|---|---|---|---|---|---|
| Sample | Yellow | Magenta | Cyan | Yellow | Magenta | Cyan |
| Comparison Sample | 18.4 | 18.6 | 19.8 | 2.98 | 3.09 | 2.80 |
| According to the invention | 18.8 | 20.0 | 20.8 | 3.20 | 3.20 | 2.90 |

A increase in sensitivity of 3 units corresponds to a doubling of sensitivity.

The more favourable properties of the dyes used in accordance with the invention by comparison with silver filter yellow layers are clearly reflected in the increase in sensitivity with a simultaneous increase in the maximal density. There is no difference between the yellow fog values of both materials, i.e. the dye used in accordance with the invention was completely washed out during processing.

EXAMPLE 2

The following layers were successively applied to a transparent support layer provided with an antihalation layer. The quantities indicated are all based on 1 m². The corresponding quantities of $AgNO_3$ are indicated for the silver coating.

MATERIAL A

1. A relatively less sensitive red-sensitive layer comprising a red-sensitised silver bromide iodide emulsion (5 mole percent of AgI) of 2.25 g of $AgNO_3$ with 700 mg of a cyan coupler corresponding to the formula

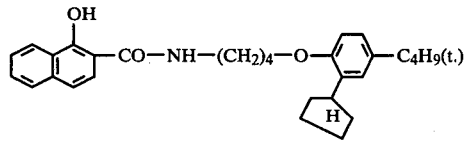

20 mg of a DIR coupler corresponding to the formula

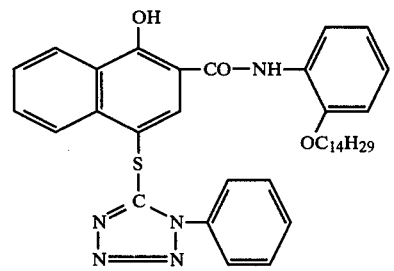

and 1.4 g of gelatin.
2. An intermediate layer of 0.7 g of gelatin
3. A relatively less sensitive green-sensitive layer comprising a green-sensitised mixture of a relatively sensitive silver bromide iodide emulsion (5 mole percent of AgI) of 1.5 g of $AgNO_3$ and a relatively insensitive silver bromide iodide emulsion (5 mole percent of AgI) of 1.9 g of $AgNO_3$ with 550 mg of a magenta coupler corresponding to the formula

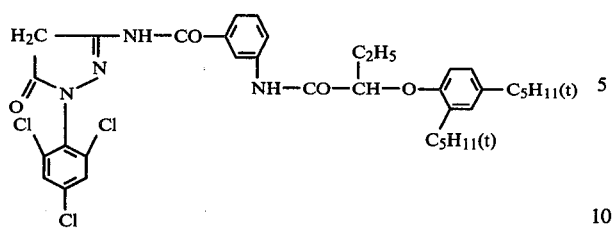

55 mg of a DIR coupler corresponding to the formula

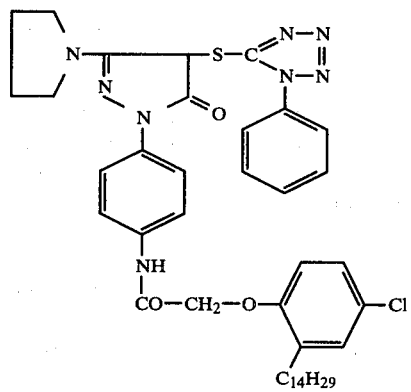

73 mg of a masking coupler corresponding to the formula

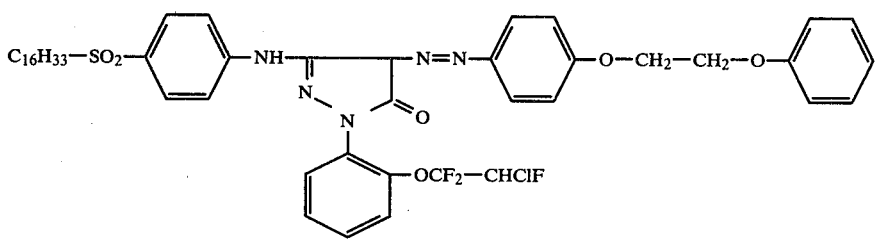

and 1.8 g of gelatin.

4. An intermediate layer containing 0.7 g of gelatin.

5. A highly sensitive red-sensitive layer comprising a red-sensitised silver bromide iodide emulsion (5 mole percent of AgI) of 2.0 g of AgNO₃ with 250 mg of the cyan coupler of layer 1.

6. A layer comprising a less sensitive silver chloride emulsion of 350 mg of AgNO₃ and 0.7 g of gelatin.

7. A highly sensitive green-sensitive layer comprising a green-sensitised silver bromide iodide emulsion (7 mole percent of AgI) of 2.8 g of AgNO₃ with 170 mg of a magenta coupler corresponding to the formula

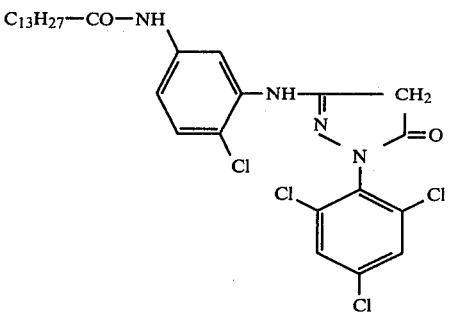

37 mg of a magenta coupler corresponding to the formula

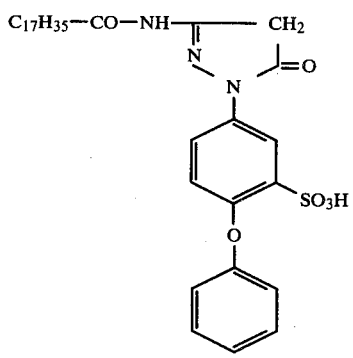

and 2.1 g of gelatin.

8. An intermediate layer of 0.7 g of gelatin.

9. A yellow filter layer of colloidal silver having a density of 0.8 (as measured behind a blue filter and a thickness of 2μ.

10. A blue-sensitive layer comprising a mixture of a relatively sensitive silver bromide iodide emulsion (2 mole percent of AgI) of 1.0 g of AgNO₃ with 1.5 g of a yellow coupler correponding to the formula

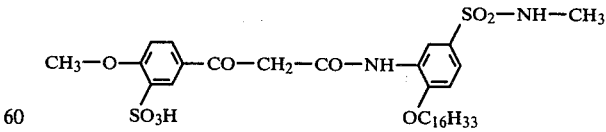

and 2.0 g of gelatin.

11. A cover layer of 0.7 g of gelatin.

MATERIAL B, INVENTION

A material according to the invention was prepared in the same way, except that, instead of the colloidal silver, a gelatin layer containing dye No. 3 according to the invention, which also has a density of 0.8, is used in the yellow filter layer (layer 9).

MATERIAL C, WITH COMPOUND OF DLP 107 990

A material was prepared in the same way as Material B except that, instead of dye No. 3 according to the invention, the following compound (a) of DLP 107 990 was used:

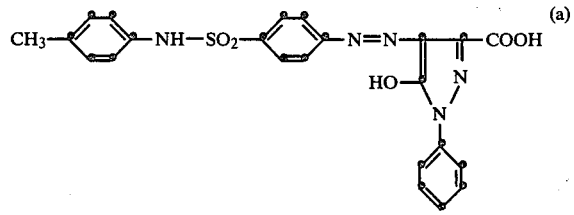

The photographic materials A and B obtained were exposed in the usual way and subjected to the following colour negative processing:

Colour development 3.25 minutes at 38° C. in a developer consisting of

|  |  |
|---|---|
| sodium hexametaphosphate | 2 g |
| sodium sulphite (sicc.) | 2.0 g |
| sodium hydrogen carbonate | 8 g |
| sodium hydrogen sulphate | 7 g |
| potassium bromide | 1.8 g |
| sodium carbonate (sicc.) | 30 g |
| hydroxyl amine sulphate | 3 g |
| 4-amino-3-methyl-N-ethyl-N (β-hydroxyethyl)-aniline | 2 g |

The further processing is carried out at 38° C. and comprises the following baths:

|  |  |  |
|---|---|---|
| bleaching bath | 4 minutes | 20 seconds |
| rinsing | 1 minute | 5 seconds |
| fixing | 4 minutes | 20 seconds |
| rinsing | 3 minutes | 15 seconds |

The baths used correspond to those described in "The British Journal of Photography", July, 1974, pages 597 and 598.

The results obtained are shown in Table III.

TABLE III

| Material | Fog | | | Rel. sensitivity | | |
|---|---|---|---|---|---|---|
|  | Yellow | Magenta | Cyan | Yellow | Magenta | Cyan |
| A | 1.12 | 0.74 | 0.31 | 21.5 | 20.7 | 20.9 |
| B | 1.19 | 0.69 | 0.30 | 21.3 | 21.7 | 21.3 |

Sensitivity was determined in the same way as in Example 1.

Table III shows that the sensitivity of the magenta component layer is distinctly increased by replacement of silver filter yellow by dye No. 3.

MATERIAL C was not suitable for practical purposes since with compound (a) of DLP 107 990 a density of the yellow filter layer of not more than 0.35 was obtained. If added in greater amounts in order to obtain a suitable density, compound (a) crystallized out.

We claim:

1. A photosensitive photographic recording material comprising at least one silver halide emulsion layer and an azo dye, wherein the azo dye corresponds to the following formula:

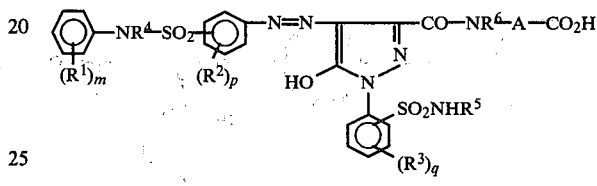

in which

R$^1$, R$^2$, R$^3$ which may be the same or different represent hydrogen; alkyl which may be substituted; aryl which may be substituted; alkoxy; halogen; carbamoyl or sulphamoyl which may be substituted; cyano or an amino group which may be substituted;

R$^4$, R$^5$, R$^6$ which may be the same or different, represent hydrogen or alkyl which may be substituted, A represents a difunctional hydrocarbonchain, m is an integer of from 1 to 5, p and q are the same or different and represent an integer of from 1 to 4.

2. A material as claimed in claim 1 wherein R$^1$, R$^2$, R$^3$ which may be the same or different represent hydrogen, alkyl which may be substituted containing up to 6 carbonatoms; phenyl, which may be substituted; methoxy or ethoxy; fluorine, chlorine or bromine; carbamoyl or sulphamoyl which may be substituted; cyano or an amino group which may be substituted;

R$^4$, R$^5$, R$^6$ which may be the same or different represent hydrogen; alkyl, which may be substituted containing from 1 to 4 carbon atoms and A represents a hydrocarbon chain containing from 1 to 6 carbon atoms.

3. A material as claimed in claim 2, wherein R$^4$, R$^5$ and R$^6$ represent hydrogen.

4. A material as claimed in claim 2 in which the dye corresponds to the following formula

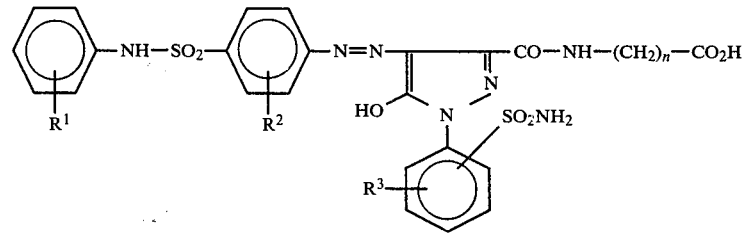

in which n is an integer of from 1 to 6.

5. A material as claimed in claim 4, characterised in that n is an integer of from 1 to 5 and $R^3$ represents hydrogen.

6. A material as claimed in claim 1, characterised in that it contains at least one dye corresponding to the following formula

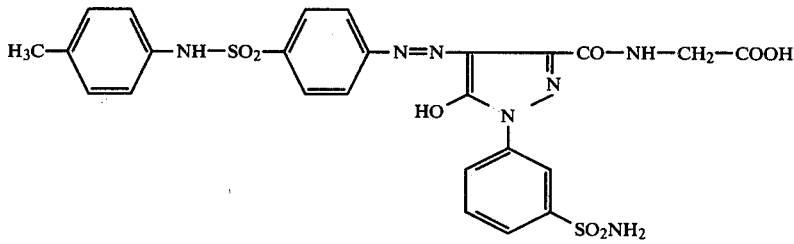

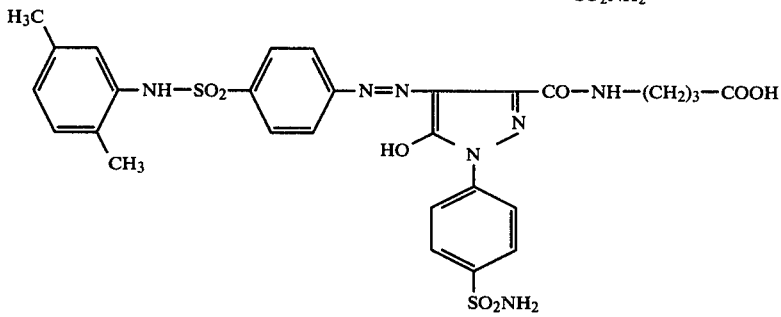

7. A material as claimed in claim 1, characterised in that the dye is contained in a filter layer.

8. A photosensitive photographic recording material comprising of at least one silver halide emulsion layer and a blue sensitive layer, a green sensitive layer and a red sensitive layer and a yellow filter layer arranged between said blue sensitive layer and the green sensitive and red sensitive layers, and an azo dye contained in the yellow filter layer, wherein the azo dye corresponds to the following formula:

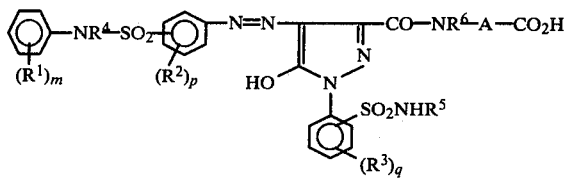

in which $R^1$, $R^2$, $R^3$ which may be the same or different represent hydrogen; alkyl which may be substituted, aryl which may be substituted; alkoxy; halogen carbamoyl or sulphamoyl which may be substituted; cyano or an amino group which may be substituted;

$R^4$, $R^5$, $R^6$ which may be the same or different, represent hydrogen or alkyl which may be substituted, A represents a difunctional hydrocarbon chain, m is an integer of from 1 to 5, p and q are the same or different and represent an integer of from 1 to 4.

* * * * *